US010036265B2

United States Patent
Mori et al.

(10) Patent No.: US 10,036,265 B2
(45) Date of Patent: Jul. 31, 2018

(54) AXIAL FLOW EXPANDER

(71) Applicant: Mitsubishi Heavy Industries Compressor Corporation, Tokyo (JP)

(72) Inventors: Kazushi Mori, Tokyo (JP); Hideki Nagao, Hiroshima (JP)

(73) Assignee: Mitsubishi Heavy Industries Compressor Corporation, Tokyo (JP)

( * ) Notice: Subject to any disclaimer, the term of this patent is extended or adjusted under 35 U.S.C. 154(b) by 174 days.

(21) Appl. No.: 14/900,555

(22) PCT Filed: Jun. 27, 2014

(86) PCT No.: PCT/JP2014/067851
§ 371 (c)(1),
(2) Date: Dec. 21, 2015

(87) PCT Pub. No.: WO2014/208777
PCT Pub. Date: Dec. 31, 2014

(65) Prior Publication Data
US 2016/0153293 A1 Jun. 2, 2016

Related U.S. Application Data

(60) Provisional application No. 61/840,802, filed on Jun. 28, 2013.

(51) Int. Cl.
*F01D 25/24* (2006.01)
*F01D 9/04* (2006.01)
(Continued)

(52) U.S. Cl.
CPC ............. *F01D 9/04* (2013.01); *F01D 1/00* (2013.01); *F01D 1/02* (2013.01); *F01D 3/02* (2013.01);
(Continued)

(58) Field of Classification Search
CPC .......... F01D 25/14; F01D 25/26; F01D 25/28; F05D 2220/31; F05D 2220/72
See application file for complete search history.

(56) References Cited

U.S. PATENT DOCUMENTS 1,726,104 A   8/1929   Harris
2,626,501 A   1/1953   Pavlecka et al.
(Continued)

FOREIGN PATENT DOCUMENTS

CN   1037190 A   11/1989
CN   1045843 A   8/1990
(Continued)

OTHER PUBLICATIONS

PCT International Search Report, dated Sep. 9, 2014, for PCT Application PCT/JP14/67851, Filed Jun. 27, 2014.
(Continued)

*Primary Examiner* — Justin Seabe
(74) *Attorney, Agent, or Firm* — International IP Law Group, P.L.L.C.

(57) ABSTRACT

The axial flow expander includes: an outer casing provided with a suction port and a discharge port through which gas is discharged from the outer casing; an inner casing inside which a gas passage is formed and which is provided with a first communication portion which communicates the gas passage with the suction port and a second communication portion which communicates the gas passage with the discharge port; a rotor shaft which extends in the direction along an axis; a bearing configured to bear the rotor shaft; stator vanes which protrudes inward from an inner periphery of the inner casing; and moving blades which protrudes outward from the rotor shaft. The inner casing, the rotor shaft, the bearing, the stator vanes, and the moving blades
(Continued)

are integrally assembled, and the assembled members are inserted into the outer casing.

7 Claims, 2 Drawing Sheets

(51) Int. Cl.
| | | |
|---|---|---|
| *F01D 25/26* | (2006.01) | |
| *F01D 25/28* | (2006.01) | |
| *F01D 1/00* | (2006.01) | |
| *F01D 1/02* | (2006.01) | |
| *F01D 25/14* | (2006.01) | |
| *F01D 5/12* | (2006.01) | |
| *F01D 3/02* | (2006.01) | |

(52) U.S. Cl.
CPC ............... *F01D 5/12* (2013.01); *F01D 25/14* (2013.01); *F01D 25/24* (2013.01); *F01D 25/26* (2013.01); *F01D 25/28* (2013.01); *F05D 2230/60* (2013.01); *F05D 2230/70* (2013.01); *Y02T 50/675* (2013.01)

(56) References Cited

U.S. PATENT DOCUMENTS

| | | | |
|---|---|---|---|
| 2,638,743 A | 5/1953 | Feilden | |
| 2,922,285 A | 1/1960 | Rae | |
| 3,408,045 A | 10/1968 | Hart | |
| 3,529,901 A | 9/1970 | Hart et al. | |
| 3,657,884 A | 4/1972 | Hugoson | |
| 3,677,019 A | 7/1972 | Olszewski | |
| 3,724,226 A | 4/1973 | Pachaly | |
| 3,817,654 A | 6/1974 | Sohma | |
| 4,019,343 A | 4/1977 | Roberts | |
| 4,102,598 A | 7/1978 | Stock et al. | |
| 4,638,638 A | 1/1987 | Marshall et al. | |
| 4,758,257 A | 7/1988 | Gates et al. | |
| 4,764,084 A | 8/1988 | Parker et al. | |
| 4,863,341 A * | 9/1989 | Groenendaal | F01D 25/246 415/103 |
| 4,915,581 A | 4/1990 | Groenendaal et al. | |
| 4,948,333 A | 8/1990 | Meer et al. | |
| 5,133,640 A | 7/1992 | Groenendaal et al. | |
| 5,651,269 A | 7/1997 | Prevost et al. | |
| 6,105,389 A | 8/2000 | Paradowski et al. | |
| 6,419,448 B1 | 7/2002 | Owczarek | |
| 6,647,744 B2 | 11/2003 | Fanning et al. | |
| 6,898,949 B2 | 5/2005 | Paradowski | |
| 7,047,764 B2 | 5/2006 | Sawchuk et al. | |
| 7,195,443 B2 | 3/2007 | Vandervort et al. | |
| 7,404,699 B2 * | 7/2008 | Thamm | F01D 5/28 415/200 |
| 7,762,766 B2 | 7/2010 | Shteyman et al. | |
| 7,785,068 B2 * | 8/2010 | Rao K V | F01D 25/26 29/888.025 |
| 8,240,045 B2 | 8/2012 | Sutcu et al. | |
| 8,414,252 B2 | 4/2013 | Rivas et al. | |
| 8,922,093 B2 | 12/2014 | Crocker | |
| 2003/0005698 A1 | 1/2003 | Keller | |
| 2005/0183452 A1 | 8/2005 | Hahn et al. | |
| 2010/0260599 A1 | 10/2010 | Yamashita et al. | |
| 2012/0107108 A1 | 5/2012 | Nagao et al. | |
| 2013/0160455 A1 | 6/2013 | Leconte et al. | |

FOREIGN PATENT DOCUMENTS

| | | |
|---|---|---|
| CN | 1057315 A | 12/1991 |
| CN | 101010488 A | 8/2007 |
| CN | 201896664 U | 7/2011 |
| EP | 0672877 A1 | 9/1995 |
| EP | 0959231 A1 | 11/1999 |
| GB | 764501 A | 12/1956 |
| GB | 893452 A | 4/1962 |
| GB | 1135766 A | 12/1968 |
| GB | 2019943 A | 11/1979 |
| JP | S55-064105 A | 5/1980 |
| JP | S62-153503 A | 7/1987 |
| JP | H04-124410 A | 4/1992 |
| JP | A-09-004409 | 1/1997 |
| JP | A-10-089013 | 4/1998 |
| JP | 2003-27901 A | 1/2003 |
| JP | A-2011-043070 | 3/2011 |
| JP | A-2013-053530 A | 3/2013 |
| WO | WO2007/021351 A1 | 2/2007 |
| WO | WO2011/135335 A2 | 11/2011 |

OTHER PUBLICATIONS

Written Opinion of the International Search Authority, dated Sep. 9, 2014, for PCT Application PCT/JP14/67851, Filed Jun. 27, 2014.
Supplementary Chinese Search Report, Related CN Application No. 2014800370967 dated Jan. 3, 2017, 3 pages.
Supplementary European Search Report, Related EP Application No. 14818484 dated Jan. 24, 2017, 2 pages.
Chinese Office Action, CN Application No. 201480035318.1 dated Jul. 11, 2016, 11 pages.
European Search Report, EP Application No. 14817351.1, dated Oct. 14, 2016, 6 pages.
Japanese Office Action, Related case JP Application No. 2016-524226 dated Apr. 6, 2018, 5 pages.
Non-Final Office Action, U.S. Appl. No. 14/900,552 dated May 2, 2018, 13 pages.

* cited by examiner

AXIAL FLOW EXPANDER

RELATED APPLICATION

This application claims priority to U.S. Provisional Patent Application Ser. No. 61/840,802 by Mori and Nagao titled "Axial Flow Expander," which was filed 28 Jun. 2013.

BACKGROUND OF THE PRESENT INVENTION

Field of the Present Invention

The present invention relates to an expander which is a rotary machine used for a refrigeration cycle or the like.

Description of Related Art

Conventionally, liquefied gases such as LNG and LPG are generated, and nitrogen and hydrogen are liquefied to separate them from air, using a refrigeration cycle that uses cold energy when expanding gases such as nitrogen gas by an expander in cooling.

However, as a rotary machine used as the expander, only a centrifugal expander for the expansion of gas having a small flow rate is known, and there is a need for a plurality of the centrifugal expanders when generating the liquefied gas in a huge plant. For this reason, such a rotary machine is not preferable to use for the huge plant in view of an increase in cost, an increase of installing space and maintenance characteristics.

Thus, it is thought to adopt an axial flow rotary machine as the expander so as to enable to cope with the expansion of the gas having a large flow rate in the huge plant and to solve the above-mentioned problems. When the axial flow rotary machine is adopted, a height dimension of a moving blade increases for coping with the large flow rate, and an occurrence of thrust power becomes the problem. However, for example, by adopting a double-flow type structure such as an axial flow turbine disclosed in the following Patent document 1, it is possible to cancel the thrust power, and performance does not decline in this respect.

PRIOR ART DOCUMENT

Patent document 1: Japanese Patent Application, First Publication No. 2003-27901

However, in consideration of the check of inner components such as a rotor shaft and a blade member, it is necessary for the rotary machine to be available to remove the inner components from a casing. The axial flow turbine disclosed in the Patent document 1 does not disclose such a structure for removing the inner components from the casing. However, it is though that there is a structure for dividing the casing into two parts in a horizontal plane, and the dividing structure is generally used. In the expander used in the refrigeration cycle, since gas to be expanded is nitrogen or the like as mentioned above, as compared to a case where the gas is vapor as in the Patent document 1, the inside of the casing is subject to high-pressure. For this reason, there may be a leak of the gas from the division surface.

The present invention is achieved in view of such circumstances, and an object thereof is to provide an axial flow expander capable of increasing the flow rate and coping with the high pressure.

SUMMARY OF THE PRESENT INVENTION

In the present invention, an axial flow expander for expanding gas flowed in a direction along an axis thereof, includes:

a cylindrical shaped outer casing centered around the axis, and provided with a suction port through which the gas is suctioned into the outer casing and a discharge port formed in both ends of the outer casing with respect to the suction port, wherein the gas is discharged from the outer casing through both ends thereof;

a cylindrical shaped inner casing centered around the axis, fixed inside the outer casing, and inside which a gas passage is formed, wherein the inner casing is provided with a first communication portion which communicates the gas passage with the suction port and a second communication portion which communicates the gas passage with the discharge port;

a rotor shaft accommodated inside the inner casing, and of which an axial center is aligned with the axis so as to extend in the direction along the axis;

a bearing fixed to the inner casing, and configured to bear the rotor shaft so as to be available to rotate around the axis with respect to the inner casing;

a plurality of stator vanes fixed to the inner casing so as to protrude inward from an inner periphery of the inner casing, and arranged inside the gas passage so as to be separated at intervals in the direction of the axis; and a plurality of moving blades fixed to the rotor shaft so as to protrude outward from the rotor shaft, and arranged inside the gas passage so as to be alternating with the plurality of stator vanes; wherein the inner casing, the rotor shaft, the bearing, the stator vanes, and the moving blades are integrally assembled, and the assembled members are inserted into the outer casing in the direction along the axis.

According to present invention, the axial flow expander is a so-called double-flow type expander in which the gas to be expanded is introduced to a gas passage in which a row of stator vanes and a row of moving blades are placed via a first communication portion from a suction port, is flowed inside the gas passage in both directions along an axis of the expander, and is discharged from a discharge port via a second communication portion. Thus, since it is possible to cancel force in the thrust direction acting on the rotor shaft by flowing the gas to the gas passage between the row of stator vanes and the row of moving blades, even if the size of the row of moving blades is enlarged due to the increase in flow rate, the stable operation can be performed.

In addition, since the assembled members in which the rotor shaft, the bearing, the row of stator vanes, and the row of moving blades are integrally assembled are accommodated in the inner casing, and are inserted into the casing, a division surface or the like is not present in the outer casing. Therefore, the number of the components can be reduced. Furthermore, since the division surface or the like is not present in the outer casing, there is no leak of the gas from the division surface, and there is no need to take measures for the leak.

Since the assembled members with the bearing can be inserted and installed into the outer casing, there is no need to provide a bearing stand to bear the bearing. Also, since there is no need for adjusting an alignment between the outer casing and the bearing stand, the installation of the assembled members to the outer casing can be easily performed.

It may be preferable such that the inner casing of the axial flow expander of the present invention includes:

an inner casing body having the stator vanes, in which the first and second communication portions are formed; and a head member fixed to both ends of the inner casing body in the direction of the axis, and to which the bearing is fixed.

According to the present invention, since the inner casing may be divided into the inner casing body and the head member, it is easy to install the bearing and the rotor shaft.

It may be preferable such that the inner casing body of the axial flow expander of the present invention includes:

a main body having the stator vanes, in which the first communication portion is formed; and a connection portion fixed to both ends of the main body in the direction of the axis, to which the head member is fixed, and in which the second communication portion is formed.

According to the present invention, the inner casing body may be divided into the main body and the connection portion. Therefore, even if the row of stator vanes, the row of moving blades, and the rotor shaft in the inner casing increase in size due to the increase in flow rate, the expander can be easily assembled.

It may be preferable such that the connection portion of the axial flow expander of the present invention includes:

an annular projection projecting in one direction along the axis from an end surface of the connection portion which faces in one direction along the axis; and an annular recessed portion formed on a surface of the main body which faces the other direction along the axis so as to dent in one direction along the axis, and to which the projection is fitted.

According to the present invention, the alignment between the connection portion and the main body is easily performed by fitting the projection with the recessed portion, and thus the inner casing can be easily assembled.

It may be preferable such that the head member of the axial flow expander of the present invention includes a discharging guide member fixed to an end surface of the head member so as to be positioned in the gas passage, and which has a guiding surface formed so as to lead the gas to the second communication portion, and wherein the guiding surface is inclined radially outward as separate from a middle of the head member in the direction of the axis.

According to the present invention, the gas which passes through the row of moving blades and the row of stator vanes in the gas passage can be smoothly guided so as to be discharged from the discharge port through the second communication portion.

According to the axial flow expander of the present invention, since the double flow type assembly, in which the rotor shaft, the row of stator vanes and the row of moving blades are integrated, is inserted into the casing, the flow rate of the axial flow expander can increase, and it is possible to withstand high pressure.

DETAILED DESCRIPTION OF THE PRESENT INVENTION

Figure 1:
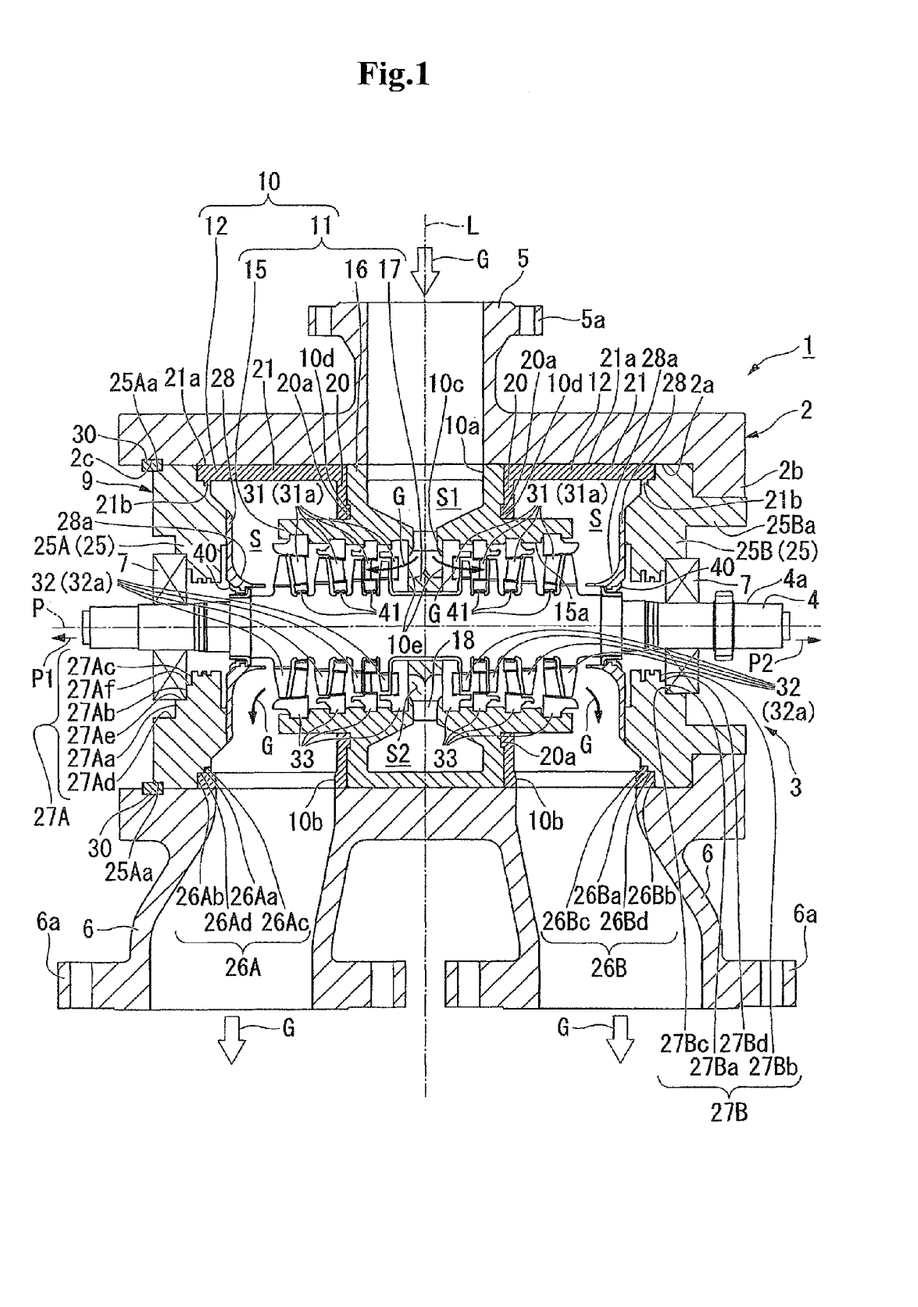
FIG. 1 is a whole cross-sectional view that shows an axial flow expander related to an embodiment of the present invention.

Hereinafter, an axial flow expander 1 related to the embodiment of the present invention will be described. The axial flow expander 1 is used as an expander for a refrigeration cycle, and it perform the expansion of nitrogen gas G. As shown in FIG. 1, the axial flow expander 1 includes a cylindrical formed outer casing 2, and an assembly 3 available to insert into the outer casing 2.

The outer casing 2 is a cylindrical body centered around an axis P and is formed so as to be symmetrical in left and right of FIG. 1 with respect to a hypothetical line L perpendicular to the axis P at a central position of the cylindrical body along the axis P direction. In addition, the outer casing 2 has a suction port 5 formed so as to protrude in a radial direction of the outer casing 2 at the central position where the hypothetical line L is drawn. The suction port 5 is provided with a through-hole passing in the radial direction, through which the inside and the outside of the outer casing 2 communicate with each other, and the nitrogen gas G can be introduced into the outer casing 2 via the through-hole. Furthermore, the suction port 5 is provided with a flange portion 5a having a great outer diameter at the outer end of the suction port 5 in the radial direction. The suction port 5 can be connected to a suction duct (not show) via the flange portion 5a.

In addition, the outer casing 2 is provided with two discharge ports 6 which are located at an opposite side of the suction port 5 with respect to the axis P so as to protrude in the radial direction of the outer casing 2, wherein one of the discharge ports 6 is positioned close to one end P1 of the outer casing 2 in the direction of the axis P (that is left side of FIG. 1), and the other of the discharge ports 6 is positioned close to the other end P2 of the outer casing 2 (that is right side of FIG. 1). Each of the discharge ports 6 has a through-hole which communicated the inside of the outer casing 3 with the outside thereof, and through which the nitrogen gas G can be discharged to the outside of the outer casing 2. In addition, a flange portion 6a is provided at an outside end portion in the radial direction of the discharge port 6, wherein the flange portion is formed such that an outer diameter of the flange portion 6a close to the outer circumferential surface of the outer casing 2 is enlarged. The discharge port 6 can be connected to a discharge duct (Not shown in FIG. 1) via the flange portion 6a.

The outer casing 2 is provided with a projection 2b annularly projecting inward in the radial direction in the end of the other end P2 in the direction of the axis P. The projection 2B is engaged with the assembly 3 when inserting the assembly 3 into the casing 2 from one end P1 of the outer casing 2, and restricts the projection of the outer casing 2 from the other end P2 to the outside of the outer casing 2. That is, the assembly 3 can be inserted into the outer casing 2 only from one end P1 of the outer casing 2.

A casing recessed portion 2c annularly dented outward in the radial direction is formed at a position close to one end P1 of the inner circumferential surface 2a of the outer casing 2. A restriction ring 30 is fitted to the casing recessed portion 2c.

Hereunder, the assembly 3 will be described. The assembly 3 includes a rotor shaft 4, a pair of bearings 7 that bears the rotor shaft 4, and an inner casing 9 that covers the rotor shaft 4 and to which the bearings 7 are fixed. The assembly 3 is provided with a row of stator vanes 31 formed inside the inner casing 9, and a row of moving blades 32 formed on the rotor shaft 4 so as to be adjacent to the row of stator vanes 31 in the direction along the axis P.

The rotator shaft 4 is formed as a rod shape centered around the axis P, and extends in the direction along the axis P. In addition, the rotor shaft 4 is formed so as to be symmetrical with respect to the hypothetical line L on one side P1 and the other side P2 in the direction of the axis P.

The bearings 7 are respectively provided at the positions of one end P1 and the other end P2 in the axial P direction, and are fixed to the inner casing 9 so as to rotatably bear the rotor shaft 4 around the axis P.

The inner casing 9 is formed as a cylindrical shape centered around the axis P, and covers the rotor shaft 4. The inner casing 9 is provided with an inner casing body 10 placed at the central position in the direction of the axis P, and head members 25 each fixed to one end P1 and the other end P2 in the direction of the axis P of the inner casing body 10. The inner casing 9 is formed as a substantial cylindrical shape and defines an inner space S within the outer casing 2.

The inner casing body 10 is provided with a partition housing (main body) 11 placed at the central position in the direction of the axis P, and first and second discharge portion casings (connection portions) 12. The first discharge portion casing 12 is placed between the partition housing 11 and one of the head members 25 (that is a first head member 25A), and the second discharge portion casing 12 is placed between the partition housing 11 and the other of the head members 25 (that is a second mead member 25B).

The partition housing 11 is provided with a cylindrical portion 15 formed as a substantially cylindrical shape and which extends in the direction of the axis P, an outer annular portion 16 which annularly protrudes outward in the radial direction from the cylindrical portion 15 in which an outer diameter thereof is formed larger than that of the cylindrical portion 15, and an inner annular portion 17 which annularly protrudes inward in the radial direction from the cylindrical portion 15 and in which an inner diameter thereof is formed smaller than that of the cylindrical portion 15.

The outer annular portion 16 is engaged with the inner circumferential surface 2a of the outer casing 2, and a first annular space S1 centered around the axis P is formed in the circumferential direction of the outer casing 2. The outer annular portion 16 is provided with a first communication portion 10a as a through-hole passing in the radial direction so that the first annular space S1 communicates with the suction port 5 in the outer casing 2.

In addition, groove portions 10d annularly dented around the cylindrical portion 15 are respectively formed on both side surfaces of the outer annular portion 16 facing in the opposite direction of the axis P. First projections (projections) 20a of annular fixtures 20 are fitted to the groove portions 10d.

The inner annular portion 17 protrudes toward the rotor shaft 4 from the cylindrical portion 15, and the dimension thereof in the direction of the axis P is smaller than that of the outer annular portion 16. A circumferential inside surface of the inner annular portion 17 is formed so as to face the rotor shaft 4, and a second annular space S2 centered around the axis P is formed in the inner annular portion 17. In addition, the inner annular portion 17 is provided with openings 10e through which the second annular space S2 communicates with a space between the rotor shaft 4 and the cylindrical portion 15.

Some of the rows of stator vanes 31 are fixed to the inside surface of the cylindrical portion 15 close to one end P1 of the outer casing 2 so that the vanes protrude inward from the inner circumferential surface 15a of the cylindrical portion 15. The remaining of the rows of stator vanes 31 are fixed to the inside surface of the cylindrical portion 15 close to the other end P2 of the outer casing 2 so that the vanes protrude inward from the inner circumferential surface 15a. In addition, a third communication portion 10c which passes in the radial direction and through which the first annular space S1 and the second annular space S2 communicate with each other is formed in the cylindrical portion 15 so as to be at the central position in the direction of the axis P. A plurality of guide vanes 18 is provided in the third communication portion 10c at intervals in the circumferential direction.

The nitrogen gas G sucked from the suction port 5 of the outer casing 2 is introduced into the first annular space S1 through the first communication portion 10a, is rectified by the guide vanes 18 in the third communication portion 10c, and then flows into the second annular space S2. Thereafter, the nitrogen gas G flows out from the second annular space S2 through the openings 10e toward one end P1 and the other end P2 of the outer casing 2. That is, the nitrogen gas G flows to the inner space S through the space between the space between the rotor shaft 4 and the cylindrical portion 15 as the gas passage of the nitrogen gas G.

The first discharge portion casing 12 is attached to the inner surface of the outer casing 2 close to one end P1 thereof with respect to the partition housing 11, and the second discharge portion casing 12 is attached to the inner surface of the outer casing 2 close to the other end P2 thereof with respect to the partition housing 11. The first discharge portion casing 12 has the annular fixture 20 that comes into contact with and is fixed to one side surface of the outer annular portion 16, and a cylindrical main body 21 that extends toward one end P1 of the outer casing 2 in the direction of the axis P from the annular fixture 20 to fix one of the head members 25 to itself. The second discharge portion casing 12 has the another annular fixture 20 that comes into contact with and is fixed to the other side surface of the outer annular portion 16, and another cylindrical main body 21 that extends toward the other end P2 of the outer casing 2 in the direction of the axis P from the annular fixture 20 to fix the other of head members 25 to itself.

The annular fixture 20 is formed as an annular shape centered around the axis P so as to come into contact with the outer annular portion 16, and is fixed via bolts. In addition, the annular fixtures 20 of the first discharge portion casing 12 has a first projection 20a formed as an annular shape in the circumferential direction and which is fitted to the groove portion 10d formed on one side surface of the outer annular portion 16. Also, the annular fixtures 20 of the second discharge portion casing 12 has another first projection 20a formed as an annular shape in the circumferential direction and which is fitted to the groove portion 10d formed on the other side surface of the outer annular portion 16.

The cylindrical main body 21 is formed integrally with the annular fixture 20. The outer circumferential surface 21a of the cylindrical main body 21 extends in the direction along the axis P, the cylindrical main body 21 is engaged with the inner circumferential surface 2a of the outer casing 2. The head member 25A is fixed to a distal end surface of the cylindrical main body 21 of the first discharge portion casing 12 via bolts or the like. Also, the head member 25B is fixed to a distal end surface of the cylindrical main body 21 of the second discharge portion casing 12 via bolts or the like. A second projection 21b formed as an annular shape in the circumferential direction is formed on the inner surface of the cylindrical main body 21 of the first discharge portion casing 12 so as to be positioned close to the distal end surface of the cylindrical main body 21. Also, another second projection 21b formed as an annular shape in the circumferential direction is formed on the inner surface of the cylindrical main body 21 of the second discharge portion casing 12 so as to be positioned close to the distal end surface of the cylindrical main body 21.

In addition, the cylindrical main body 21 of the first discharge portion casing 12 is provided with a second communication portion 10b as a through-hole passing in the radial direction so as to cause the inner space S and the discharge port 6 in the outer casing 2 to communicate with each other. Also, the cylindrical main body 21 of the second discharge portion casing 12 is provided with another second communication portion 10b as a through-hole passing in the radial direction so as to cause the inner space S and the discharge port 6 in the outer casing 2 to communicate with each other. The nitrogen gas G flowing through the gas passage between the row of stator vanes 31 and the row of the moving blades 32 in the inner space S is discharged to the outside of the outer casing 2 from the discharge port 6 via the second communication portions 10b.

A first head member 25A (25) is fixed to the cylindrical main body 21 of the first discharge portion casing 12 via bolts or the like so as to face the partition housing 11 in the direction of the axis P. A second head member 25B (25) is fixed to the cylindrical main body 21 of the second discharge portion casing 12 via bolts or the like so as to face the partition housing 11 in the direction of the axis P.

The first head 25A is formed as an annular shape centered around the axis P, and is provide with a step portion 27A having three steps by being recessed in a disc shape centered around the axis P from the end surface facing one end P1 of the outer casing 2. Because of this, thereby, three surfaces of a first surface 27Ad, a second surface 27Ae, and a third surface 27Af facing the radial direction, and three surfaces of a first step surface 27Aa, a second step surface 27Ab and a third step surface 27Ac facing the axis P direction are sequentially formed from one end P1 of the outer casing 2. The bearing 7 is engaged with the second step surface 27Ab and the second surface 27Ae, and is fixed via bolts or the like.

In addition, the first head 25A is provided with an inner step portion 26A having a step shape of two steps when viewed in the radial direction, by being dented in an annular shape centered around the axis P at the outer end position in the radial direction, on the surface facing the other end P2 of the outer casing 2. Two surfaces of a first surface 26Ac and a second surface 26Ad facing the radial direction are sequentially formed from the other end P2 of the outer casing 2, and two surfaces of a first step surface 26Aa and a second step surface 26Ab facing the axis P direction are sequentially formed from the other end P2 of the outer casing 2. The second projection 21b of the cylindrical main body 21 is fitted to the first step surface 26Aa and the first surface 26Ac, and the leading end portion located on the head member 25 side rather than the second projection 21b of the cylindrical main body 21 is fitted to the second step surface 26Ab and the second surface 26Ad. In this state, the first head 25A is fixed to the cylindrical main body 21 in the end portion of the outer end in the radial direction.

An annular discharge guide 28 is disposed on the side surface of the first head 25A facing the other end P2 of the outer casing 2 so as to face the partition housing 11 in the direction along the axis P. The discharge guide 28 has a guiding surface 28a that is gradually curved outward from the inside in the radial direction as close to one end P1 of the outer casing 2, that is as separate from the central position in the direction of the axis P. The guiding surface 28a guides the nitrogen gas C which is sucked from the suction port 5 and flows in the gas passage in the inner space S toward one end P1 of the outer casing 2, toward the second communication portion 10b formed in the first discharge portion casing 12. Furthermore, an inner circumferential surface of the discharge guide 28 faces the outer circumferential surface 4a of the rotor shaft 4, and a sealing member 40 for reducing the gas-leak is provided between the discharge guide 28 and the rotor shaft 4.

In addition, the first head 25A is formed with a head recessed portion 25Aa dented annularly in the direction along the axis P and the radial direction so that a corner portion of the outer end in the radial direction on one end P1 of the outer casing 2 is chamfered. In the state where the whole assembly 3 is inserted into the outer casing 2, the head recessed portion 25Aa is located so as to face the casing recessed portion 2c, and the surfaces facing one end P1 of the outer casing 2 in the head recessed portion 25Aa and the casing recessed portion 2c are the same surface. In this state, a restriction ring 30 is provided which is fitted to the head recessed portion 25Aa and the casing recessed portion 2c and restricts the movement of the first head 25A to one end P1 of the outer casing 2.

The second head 25B is formed as an annular shape as in the first head 25A, and is provided with a step portion 27B having two steps by being recessed in a disc shape centered around the axis P from the end surface facing the other end P2 of the outer casing 2. Because of this, two surfaces of a first surface 27Bc and a second surface 27Bd facing the radial direction and two surfaces of a first step surface 27Ba and a second step surface 27Bb facing the axis P direction are sequentially formed from the other end P2 of the outer casing 2. The bearing 7 is engaged with the second step surface 27Bb and the second surface 27Bd and is fixed via bolts or the like.

In addition, as in the first head 25A, the second head 25B is provided with an inner step portion 26B having a step shape of two steps when viewed in the radial direction, by being dented in an annular shape centered around the axis P at the outer end position in the radial direction, on the surface facing one end P1 of the outer casing 2, and a first surface 26Bc, a second surface 26Bd, a first step surface 26Ba and a second step surface 26Bb are formed. In this state, the second head 25B is fixed to the cylindrical main body 21 in the outer end in the radial direction.

As in the first head 25A, an annular discharge guide 28 is disposed on the side surface of the second head 25B facing one end P1 of the outer casing 2 so as to face the partition housing 11 in the direction along the axis P. The discharge guide 28 has a guiding surface 28a that is gradually curved outward from the inside in the radial direction as close to the other end P2 of the outer casing 2, that is as separate from the central position in the direction of the axis P. The guiding surface 28a guides the nitrogen gas G, which is sucked from the suction port 5 and flows in the gas passage in the inner space S toward the other end P2 of the outer casing 2, toward the second communication portion 10b formed in the second discharge portion casing 12. Furthermore, an inner circumferential surface of the discharge guide 28 faces the outer circumferential surface 4a of the rotor shaft 4, and a sealing member 40 for reducing the gas-leak is provided between the discharge guide 28 and the rotor shaft 4.

In addition, in the second head 25B, on the other end P2 of the outer casing 2, a head projection 25Ba protruding annularly centered around the axis P toward the other end P2 from the middle position in the radial direction is integrally provided. The surface facing outward the radial direction of the head projection 25Ba is engaged with the projection 2b in the outer casing 2. Furthermore, at the outer position of the head projection 25Ba in the radial direction, the end surface of the second head 25B facing the other end P2 of the outer casing 2 is engaged with the projection 2b. That is, the projection of the second head 25B from the outer casing 2 toward the other end P2 is restricted by the projection 2b. Thereby, the projection of the whole assembly 3 to the other end P2 in the direction along the axis P is restricted.

Next, the row of stator vanes 31 and the row of moving blades 32 will be described. The row of stator vanes 31 is a vane member fixed to the cylindrical portion 15 in the partition housing 11, and a plurality of rows thereof is provided at the position interposed between the opening 10e in the inner annular portion 17 and the guiding surface 28a of the discharging guide 28 provided in the head member 25 at intervals in the direction of the axis P. Furthermore, in the embodiment, four rows of the stator vanes 31 are provided in each of one end P1 and the other end P2 of the outer casing 2 so as to be symmetrical to one end P1 and the other end P2 in the direction along the axis P with respect to the hypothetical line L serving as the central position in the direction along the axis P.

Each of the rows of stator vanes 31 includes a plurality of stator vanes 31a provided circumferentially on the inner circumferential surface 15a of the cylindrical portion 15 at predetermined intervals. The stator vanes 31a are fixed to the cylindrical portion 15 via an annular partition 33 provided on the inner circumferential surface 15a of the cylindrical portion 15, and extend so as to face the outer circumferential surface 4a of the rotor shaft 4 inward in the radial direction, that is, toward the rotor shaft 4.

Although the detailed description will be omitted, each of the stator vanes 31a forms a cross-section of a blade shape in which a dorsal surface facing the one end in the circumferential direction has a projecting shape, and a ventral surface facing the other in the circumferential direction has a recessed shape, and the sealing member 41 for reducing the leak flow at the position facing the rotor shaft 4 is provided.

The row of moving blades 32 is a blade member fixed to the outer circumferential surface 4a of the rotor shaft 4, and is provided so as to be alternately adjacent to the row of stator vanes 31 at the position of the downstream side of each of the row of stator vanes 31, that is, near one end P1 of the outer casing 2 rather than the opening 10e. In addition, at the position of the other end P2 in the direction of the axis P further than the opening 10e, the row of moving blades 32 is also provided so as to be alternately adjacent to the row of stator vanes 31. In this manner, in the present embodiment, four rows are provided in each of one end P1 and the other end P2 in the direction along the axis P so as to be symmetrical to one end P1 and the other end P2 in the direction along the axis P with respect to the hypothetical line L serving as the central position in the direction along the axis P.

Each of the row of moving blades 32 includes a plurality of moving blades 32a provided circumferentially on the outer circumferential surface of the rotor shaft 4 at predetermined intervals, the moving blades 32a are fixed to the rotor shaft 4, and extend outward in the radial direction, that is, toward the partition 33 for fixing the stator vanes 31a.

Although the detailed description will be omitted, each of the moving blades 32a forms a cross-section of a blade shape in which a dorsal surface facing the other end in the circumferential direction has a projecting shape, and a ventral surface facing the one end in the circumferential direction has a recessed shape.

In this manner, the portion in the inner space S provided with the row of stator vanes 31 and the row of moving blades 32 serves as a gas passage of the nitrogen gas G, the nitrogen gas G flowed-in from the opening 10e distributes in the gas passage, pressure energy of the nitrogen gas G is converted into speed energy and is finally converted into rotation energy of the rotor shaft 4. The nitrogen gas G decreases in pressure and expands while circulating in one end P1 and the other end P2 of the outer casing 2, that is, while distributing downward in the gas passage.

In the axial flow expander 1, a so-called double flow type is adopted which causes the nitrogen gas G to flow in the gas passage of the inner space S from the suction port 5 of the outer casing 2 provided at the central position in the direction along the axis P via the first communication portion 10a, further causes the nitrogen gas G to be distributed in both directions of one end P1 and the other end P2 in the gas passage of the outer casing 2, and causes the nitrogen gas G to flow out of the discharge port 6 via the second communication portion 10b.

Thus, when the nitrogen gas G is decompressed and expanded by passing through the gas passage to rotate the rotor shaft 4, thrust power acting in the direction along the axis P is generated according to the rotation of the row of moving blades 32. Herein, by making the structure in the assembly 3 to the double flow type, the thrust power generated in each direction along the axis P is cancelled, and even if the row of moving blades 32 increases according to the increase in flow rate and the generated thrust power increases, the stable operation is possible.

Furthermore, in the assembly 3, the row of stator vanes 31 and the row of moving blades 32 are provided symmetrically with reference to the hypothetical line L. For this reason, the thrust power is symmetrically generated in one end P1 and the other end P2 of the outer casing 2 with respect to the hypothetical line L of the central position of the direction along the axis P. Thus, it is possible to further increase the effect of cancelling the thrust power.

In addition, since the rotor shaft 4, the row of stator vanes 31 and the row of moving blades 32 are integrated in the state of being covered by the inner casing 10 and the assembly 3 is inserted into the outer casing 2, the division surface is not present in the outer casing 2. Thus, the outer casing 2 does not require the fastening component or the like, and thus the number of the components can be reduced.

In addition, since the division surface is not present in the outer casing 2, the nitrogen gas G does not leak from the inner space S through the division surface, and there is no need for leak measures.

Furthermore, in the state where the bearing 7 is also included in the integral assembly 3, the assembly 3 can be installed by inserting the assembly 3 into the outer casing 2. For that reason, there is no need to separately provide the bearing stand outside the outer casing 2 to bear the bearing 7. Thus, since there is also no need for alignment adjustment or the like between the outer casing 2 and the bearing stand, labor-saving of the installation is possible.

In addition, the inner casing 9 in the assembly 3 is provided with the partition housing 11, the discharge portion casing 12, and the head member 25. Thus, even if the assembly 3 increases in size in accordance with the increase in flow rate, the assembly 3 can be easily assembled.

Furthermore, the fixing work of the discharge portion casing 12 of the inner casing body 10 and the partition housing 11 is performed in the state where the first projection 20a is fitted into the groove portion 10d. Furthermore, since the fixing work of the discharge portion casing 12 and the head member 25 is performed in the state where the inner step portion 26A is fitted into the second projection 21b, positioning thereof is easily performed, and thus the labor required for installation can be reduced.

In addition, since the head member 25 is provided with the discharge guide 28, the nitrogen gas G passing through the gas passage between the row of stator vanes 31 and the row of moving blades 32 can be guided outward in the radial direction by the guiding surface 28a, and thus the nitrogen gas G can be smoothly discharged from the discharge port 6 through the second communication portion 10b.

According to the axial flow expander 1 of the embodiment, the double flow type assembly 3, which has the rotor shaft 4, the bearing 7, the row of stator vanes 31 and the row of moving blades 32 and is integrated within the outer casing 2, is inserted into the outer casing 2. For this reason, since the flow rate can increase and the leak of the nitrogen gas G from the outer casing 2 can be prevented, it is possible to cope with high pressure.

The embodiment of the present invention has been described in detail. However, some design changes can be made within the scope that does not depart from the technical idea of the present invention. For example, in the embodiment of the present invention, although the inner casing 9 is provided with the discharge portion casing 12, the partition housing 11 and the head member 25, the components may be a one-piece structure.

In addition, the head member 25 and the discharge guide 28 also may be a one-piece structure like the inner casing 9.

Furthermore, although the first projection 20a and the second projection 21b are formed which prevent the position deviation when fixing the discharge portion casing 12, the partition housing 11 and the head member 25 one another, the shapes and the forming positions thereof are not limited to the above-mentioned embodiment.

Furthermore, in the above-mentioned embodiment, the suction port 5 is provided at the central position in the direction along the axis P, the discharge ports 6 are provided in one end P1 and the other end P2 of the outer casing 2, and the row of stator vanes 31 and the row of moving blades 32 are placed such that one end P1 and the other end P2 are completely in bilateral-symmetrical with respect to the central position in the direction along the axis P. However, the installing position of the suction port 5 is not limited to the central position, the discharge ports 6 may be provided at least at the positions of both ends, which are one end P1 and the other end P2 with respect to the suction port 5, and the row of stator vanes 31 and the row of moving blades 32 may not be provided so as to be completely symmetrical in one end P1 and the other end P2 with respect to the hypothetical line L.

Figure 2:
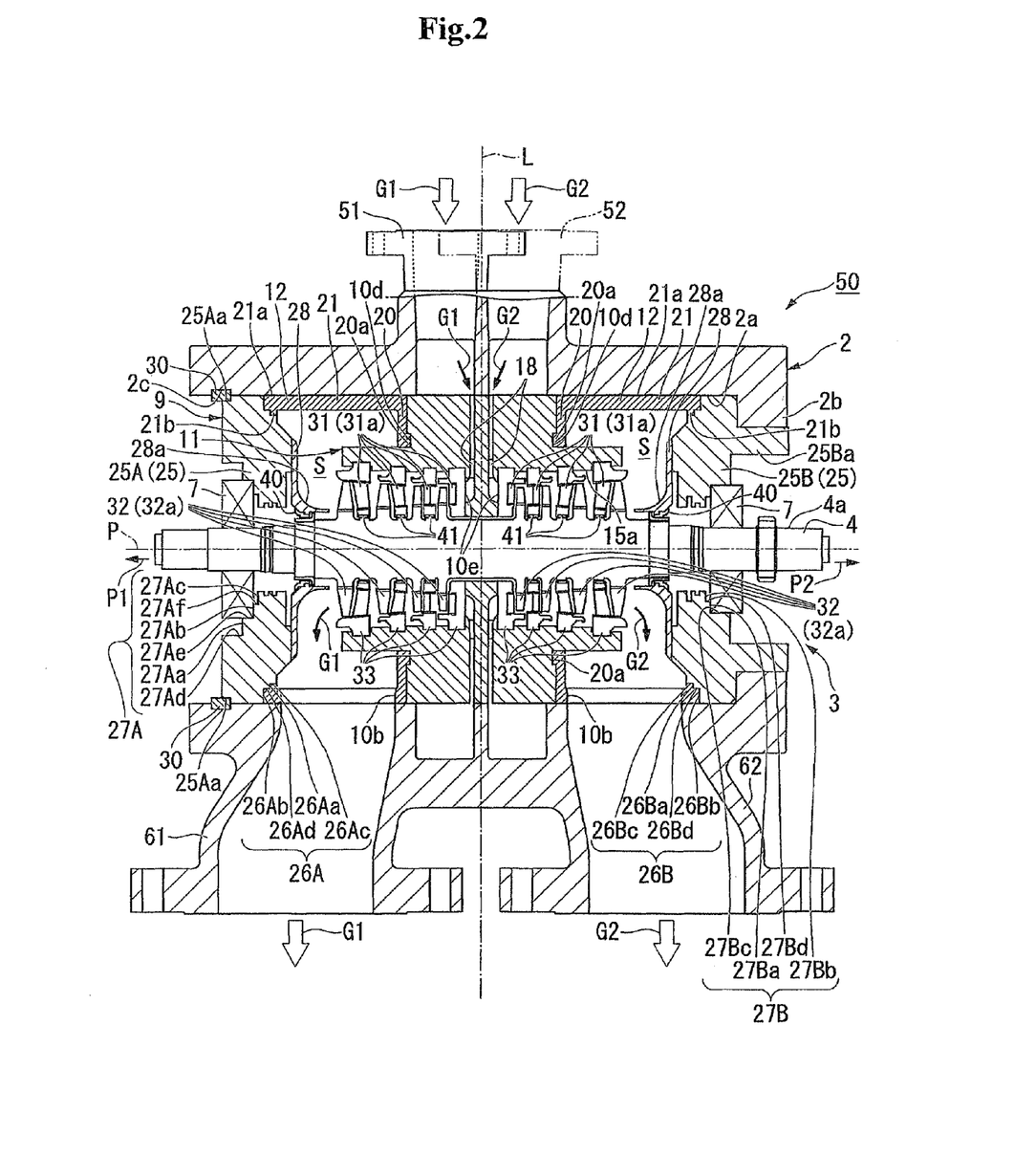
FIG. 2 is a whole cross-sectional view that shows the axial flow expander related to a modification of the embodiment of the present invention.

Furthermore, as shown in FIG. 2, the axial flow expander may be an axial flow expander 50 that is provided with two suction ports 51 and 52 having a space therebetween in the circumferential direction along the axis P so as to protrude outward in the radial direction along the axis P at the central position where the hypothetical line L is drawn. The axial flow expander 50 has a two-section structure capable of causing that the gas G1 supplied from the suction port 51 flows to the discharge port 61 of one end P1 of the outer casing 2 and capable of causing that the gas G2 supplied from the suction 52 flows to the discharge port 62 of the other end P2 of the outer casing 2. Thus, it is possible to perform the operation of causing the gases G1 and G2 each having the different conditions to distribute.

In addition, the projection 2b may not be necessarily provided in the outer casing 2, and in this case, it is possible to insert the assembly 3 from both of one end P1 and the other end P2. Furthermore, the guiding surface 28a of the discharge guide 28 may not be curved, and may be formed so as to be linearly inclined when viewed in the circumferential direction.

Furthermore, the plurality of guide vanes 18 provided circumferentially in the third communication portion 10c at intervals may not have necessarily a vane shape but a cross-section thereof in the direction of the axis P may be a circular shape or the like.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. An axial flow expander for expanding gas flowed in a direction along an axis thereof, comprising:
    a cylindrical shaped outer casing centered around the axis, and provided with a suction port through which the gas is suctioned into the outer casing and a pair of discharge ports formed in both ends of the outer casing with respect to the suction port, wherein the gas is discharged from the outer casing through both ends thereof;
    a cylindrical shaped inner casing centered around the axis, fixed inside the outer casing, and inside which a gas passage is formed, wherein the inner casing is provided with a first communication portion which communicates the gas passage with the suction port and which placed at a central position in direction of the axis and a pair of second communication portions which communicate the gas passage with the pair of discharge ports;
    a rotor shaft accommodated inside the inner casing, and of which an axial center is aligned with the axis so as to extend in the direction along the axis;
    a bearing fixed to the inner casing, and configured to bear the rotor shaft so as to be available to rotate around the axis with respect to the inner casing;
    a plurality of stator vanes fixed to the inner casing so as to protrude inward from an inner periphery of the inner casing, and arranged inside the gas passage so as to be separated at intervals in the direction of the axis; and
    a plurality of moving blades fixed to the rotor shaft so as to protrude outward from the rotor shaft, and arranged inside the gas passage so as to be alternating with the plurality of stator vanes; wherein
    the inner casing, the rotor shaft, the bearing, the stator vanes, and the moving blades are integrally assembled, and the assembled members are inserted into the outer casing in the direction along the axis.

2. The axial flow expander according to claim 1, wherein:
    the bearing comprises a first bearing and a second bearing; and
    the inner casing comprises:
        an inner casing body having the stator vanes, in which the first and second communication portions are formed;
        a first head member fixed to a first end of the inner casing body in the direction of the axis, and to which the first bearing is fixed; and
        a second head member fixed to a second end of the inner casing body in the direction of the axis, and to which the second bearing is fixed.

3. The axial flow expander according to claim 2, wherein the inner casing body comprises:
- a main body having the stator vanes, in which the first communication portion is formed; and
- a connection portion fixed to both ends of the main body in the direction of the axis, to which the first and second head members are fixed, and in which the pair of second communication portions is formed.

4. The axial flow expander according to claim 3, wherein the connection portion comprises:
- an annular projection projecting in one direction along the axis from an end surface of the connection portion which faces in one direction along the axis; and
- an annular recessed portion formed on a surface of the main body which faces the other direction along the axis so as to dent in one direction along the axis, and to which the projection is fitted.

5. The axial flow expander according to claim 2, wherein each of the first and second head members comprises a discharging guide member fixed to an end surface of the first and second head members so as to be positioned in the gas passage, and which has a guiding surface formed so as to lead the gas to the pair of second communication portions, and wherein the guiding surface is inclined radially outward as separate from a middle of the first and second head members in the direction of the axis.

6. The axial flow expander according to one of claim 3, wherein each of the first and second head members comprises a discharging guide member fixed to an end surface of the first and second head members so as to be positioned in the gas passage, and which has a guiding surface formed so as to lead the gas to the pair of second communication portions, and wherein the guiding surface is inclined radially outward as separate from a middle of the first and second head members in the direction of the axis.

7. The axial flow expander according to one of claim 4, wherein each of the first and second head members comprises a discharging guide member fixed to an end surface of the first and second head members so as to be positioned in the gas passage, and which has a guiding surface formed so as to lead the gas to the pair of second communication portions, and wherein the guiding surface is inclined radially outward as separate from a middle of the first and second head members in the direction of the axis.

\* \* \* \* \*